July 19, 1960
T. E. STURGEON
2,945,646
CONVERTIBLE AIRPLANE
Filed June 4, 1957
3 Sheets-Sheet 1
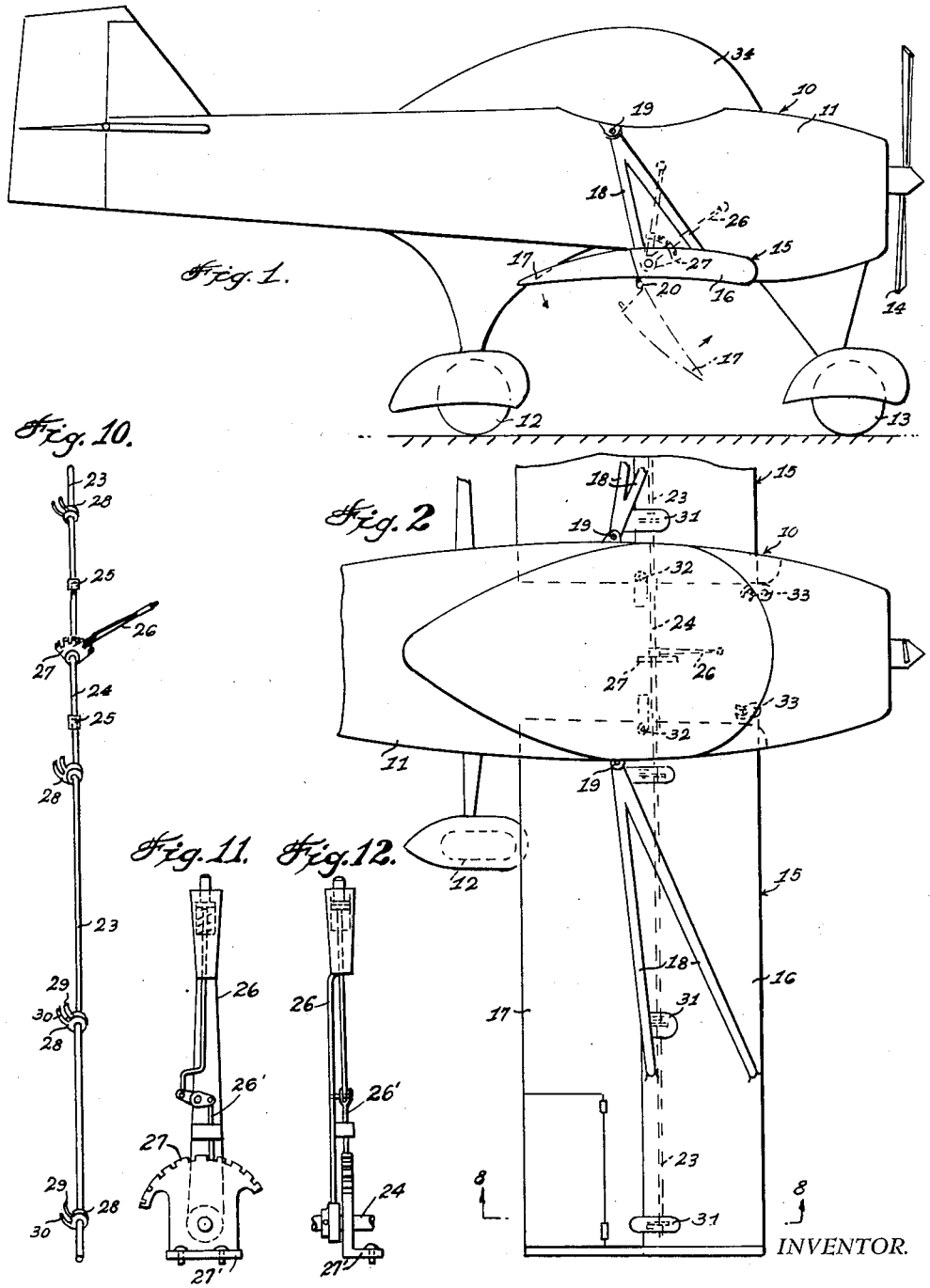
INVENTOR.
THOMAS E STURGEON
BY Victor J. Evans & Co.
ATTORNEYS July 19, 1960 T. E. STURGEON 2,945,646
CONVERTIBLE AIRPLANE
Filed June 4, 1957 3 Sheets-Sheet 2
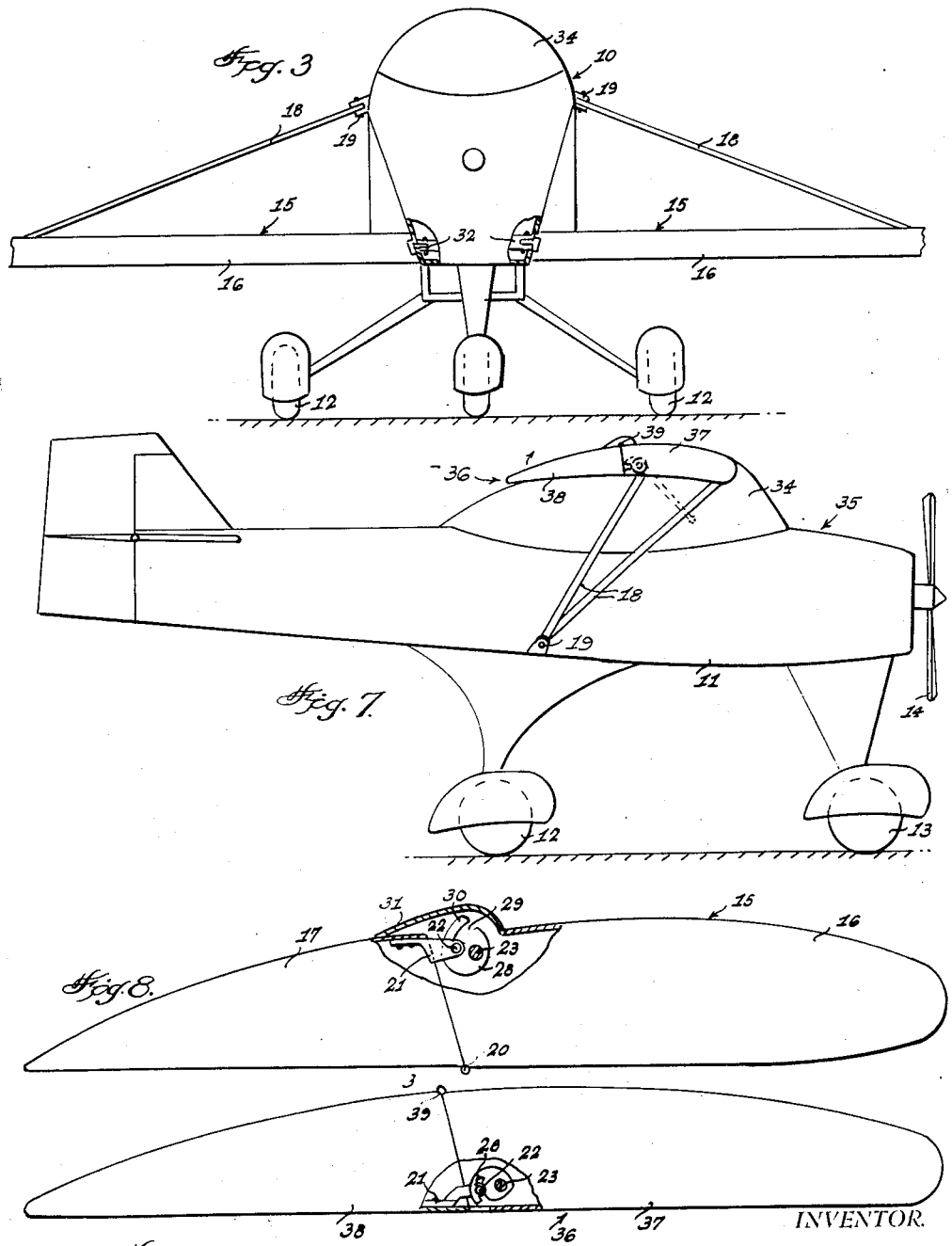
INVENTOR.
THOMAS E. STURGEON
BY Victor J. Evans & Co.
ATTORNEYS July 19, 1960 T. E. STURGEON 2,945,646
CONVERTIBLE AIRPLANE
Filed June 4, 1957 3 Sheets-Sheet 3
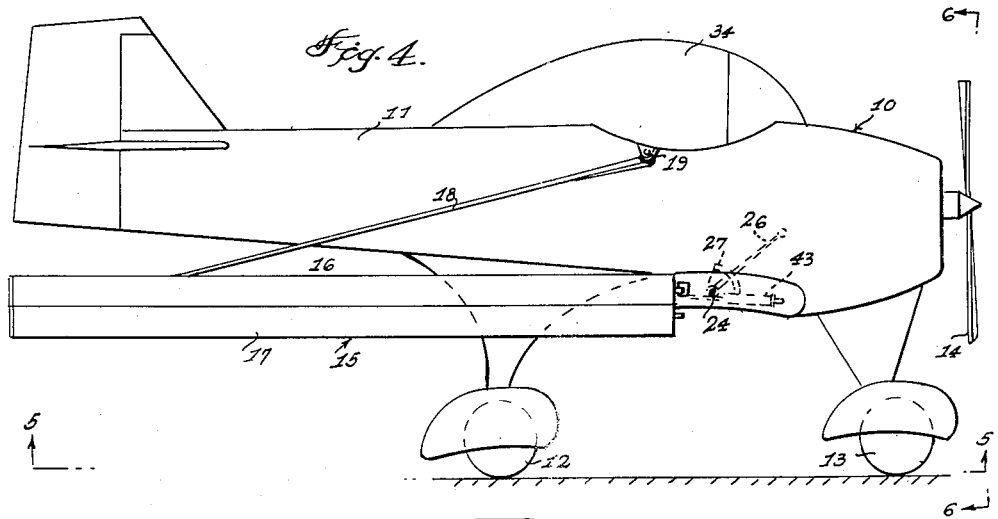
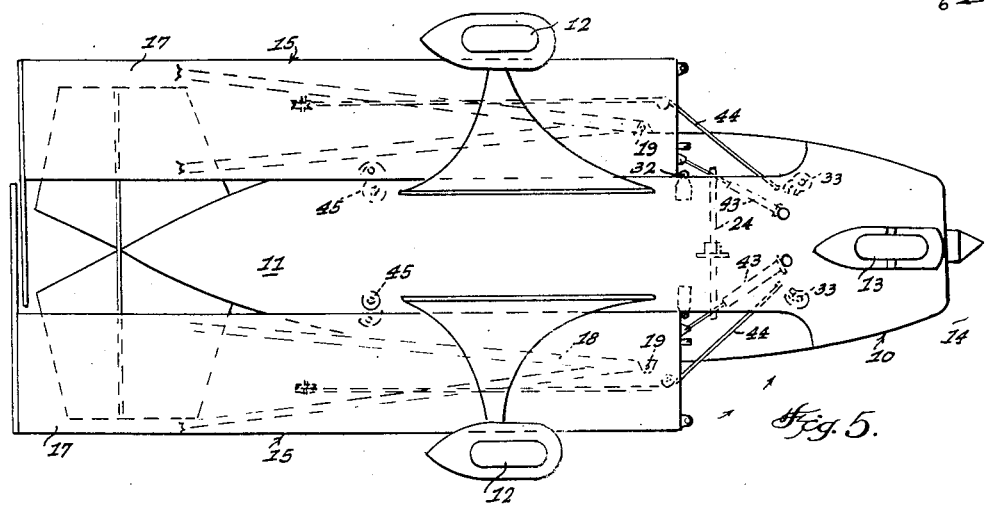
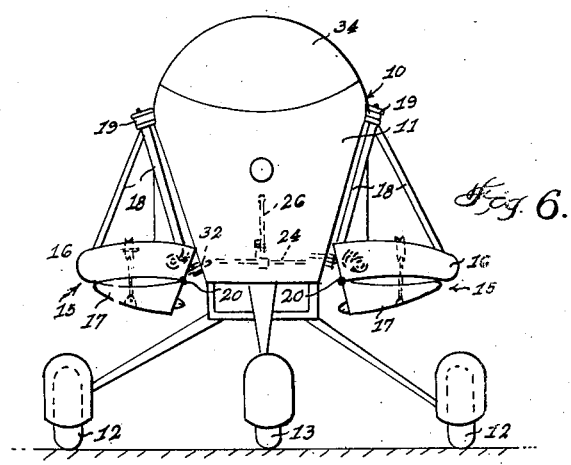
INVENTOR.
THOMAS E STURGEON
BY Victor J. Evans & Co.
ATTORNEYS United States Patent Office 2,945,646
Patented July 19, 1960

2,945,646

CONVERTIBLE AIRPLANE

Thomas E. Sturgeon, Sauk Prairie Ranches, Darrington, Wash.

Filed June 4, 1957, Ser. No. 663,417

3 Claims. (Cl. 244—49)

This invention relates to a convertible airplane or aircraft.

The object of the invention is to provide an aircraft which includes wings which can be moved to a folded or collapsed position whereby the aircraft can be used for travel along a roadway or the like so that the device can be used as a vehicle.

Another object of the invention is to provide an aircraft which includes collapsible or foldable wings whereby with the wings in folded or collapsed position, the device can be used as a vehicle for travel along the ground or along the highway, the wings being foldable so that the device will occupy a small amount of space whereby the width of the vehicle will be kept within the requirements of the various requirements for a vehicle which is used in travel along the road, highway or the like.

Another object of the invention is to provide a convertible aircraft which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view of an aircraft, constructed according to the present invention, and showing the wings in extended position.

Figure 2 is a fragmentary top plan view showing the parts in the position of Figure 1.

Figure 3 is a front elevational view showing the parts in the position of Figures 1 and 2.

Figure 4 is a side elevational view showing the wings in folded position whereby the aircraft can be used as a vehicle for travel along a road, highway or the like.

Figure 5 is a sectional view taken on the line 5—5 of Figure 4.

Figure 6 is a sectional view taken on the line 6—6 of Figure 4.

Figure 7 is a side elevational view illustrating a modification and showing the principle of the present invention being used on an aircraft which has a high wing instead of a low wing.

Figure 8 is a sectional view taken on the line 8—8 of Figure 2.

Figure 9 is a view similar to Figure 8 but showing the modification of Figure 7.

Figure 10 is a fragmentary elevational view showing the means for moving the shafts.

Fig. 11 is a side elevational view of a handle and its associated parts that are used to control the shaft for operating the collapsible wings of the aircraft; and Fig. 12 is an elevational view of the handle of Fig. 11 turned 90 degrees from the position shown in Fig. 11.

Referring in detail to the drawings, the numeral 10 indicates an aircraft which is convertible so that it can be used at times as a conventional vehicle for travel along a road, highway or the like, and the aircraft 10 includes a fuselage 11, and wheels 12 and 13, as well as a propeller 14.

There is further provided foldable or collapsible wings which are each indicated generally by the number 15, and the wings 15 each include a first portion 16 and a second portion 17. Struts 18 have one end pivotally connected to the fuselage 11 by means of a pivot assembly 19, while the other ends of the struts 18 are secured to the first portion 16 of the wings 15.

The portions 16 and 17 are pivotally or hingedly connected together by means of hinges 20, Figure 8. Brackets 21 are secured to the portion 17 in any suitable manner, and the brackets 21 carry pins 22. A rotary shaft 23 is rotatably supported in each of the first portions 16 of the wings 15, and a detachable coupling 25 is adapted to be used for connecting the shaft 23 to a shaft 24, the shaft 24 being rotatably mounted in the fuselage 11. A lever or handle 26 is provided for rotating the shaft 24, the lever or handle has a manually controlled spring biased pawl 26' mounted thereon, and a ratchet 27 is provided for engagement with a portion of the pawl 26' maintaining the lever 26 immobile in its various adjusted positions. The ratchet 27 has an apertured plate 27' extending therefrom which is secured to the fuselage 11 so that the ratchet 27 is retained in immobile relation to the lever 26. A plurality of hook members 28 are secured to the shaft 23, and the hook members 28 are provided with slots 29 which define fingers 30, and the fingers 30 are adapted to engage the pins 22. Hoods or cover members 31 may be arranged over the hook members 28 so as to prevent dirt, or other foreign matter from interfering with these parts.

One corner of each of the first portions 16 of the wings 15 is hingedly connected to the fuselage 11 by means of a pivot connection 32. Locks 33 are provided for retaining the portions 16 of the wings 15 connected to the fuselage 11, when the device is being used as an airplane. The aircraft 10 may be provided with a conventional cabin 34 for holding occupants of the aircraft or vehicle, and this cabin 34 may be suitably enclosed by a transparent plastic type of material whereby occupants of the vehicle can readily observe the surrounding area.

Referring to Figures 7 and 9 of the drawings, there is shown a slightly modified aircraft which is indicated generally by the numeral 35, and the aircraft 35 is of the high wing type rather than the low wing type as is illustrated in Figure 1, for example. In Figures 7 and 9 the wings are indicated by the numeral 36, and each wing 36 includes a first portion 37 and a second portion 38. These portions are hingedly connected together by means of hinges 39 which are arranged in the upper position instead of in the lower position as is the case with the hinge 20 shown in Figure 8.

From the foregoing, it is apparent that there has been provided an aircraft which includes wings that can be folded so that the aircraft can be used as a vehicle for travel along a highway, street, or the like. When the apparatus is being used as an aircraft, or airplane, the wings such as the wings 15 or 36 are in the extended position so that they extend outwardly at right angles to the fuselage, as for example, as shown in Figure 1 or in Figure 7. Thus, the propeller 14 can be used to cause the aircraft to fly and it will be seen that when the device is being used as a conventional aircraft, the portions 16 and 17 of the wings 15 lie in substantially the same plane so that the portion 17 is behind the portion 16.

When the aircraft is used during normal flight, the portions 16 and 17 are in the position shown in Figure 1 for example so that the propeller 14 will propel the aircraft through the air in the usual manner. However, when the aircraft is to be used as a vehicle for travel along a road, street or the like, the lever 26 can be gripped to rotate the shaft 24 and this in turn will rotate the shafts 23 due to the provision of the couplings 25. As the shafts 23 rotate, the hook members 28 will rotate so that the fingers 30 will move out of engagement with the pins 22 whereby the portions 17 will be able to pivot from the solid line position shown in Figure 1 to the broken line position shown in Figure 1. The portion 17 can thus be swung on the pivots or hinges 20 to a position directly beneath the portion 16. Then, the locks or keepers 33 can be unlocked and the folded wings can be pivoted about the pivots 32 from the position shown in Figures 1, 2 and 3 to the position shown in Figures 4, 5 and 6. It will thus be seen that in Figures 4, 5 and 6 the wings are arranged so that their longitudinal axis is parallel to the longitudinal axis of the fuselage 11 whereby the entire assembly will occupy a minimum amount of space, so that it can conveniently be driven along a road, highway, or the like. The couplings 25 may be in the nature of a socket on one of the shafts such as the shaft 23 which is adapted to engage a suitable shank on an end of the shaft 24. The engagement of the pawl 26' with the ratchet 27 serves to maintain the lever 26 immobile in its various adjusted positions. The hook members 28 may be enclosed or covered by means of the hoods 31 which help to prevent foreign matter from entering these parts and which also serves to minimize drag from wind resistance or the like. The locks 33 serve to maintain the portion 16 in a position at right angles to the longitudinal axis of the fuselage 11. By moving the lever 26, the shaft 24 will be rotated and this in turn will cause rotation of the shafts 23 which in turn will move the hook members 28 so that the pins 22 will be free of the slot 29 in the hook members 28. Thus, the portion such as the portion 17 will be able to pivot downwardly about the hinge pins 20. Or, as shown in Figures 7 and 9, the portions 38 can be pivoted upwardly about the hinge pins 39. In Figures 7 and 9 the portions 38 are adapted to be swung up to a position on top of the portions 37 when the device is not being used as an aircraft. The struts, such as the struts 18 each have an end pivotally connected to the fuselage 11 by means of the hinge construction 19, while the other ends of the struts 18 are rigidly secured to the portion 16 of the wings. The wheels, such as the wheels 12 and 13 can be used for supporting the device when it is being driven along the ground.

It will be seen that each of the wings 15 includes a pair of portions which are longitudinally split so that the wings can be folded to occupy a minimum amount of space. Thus, the device can be used as either an airplane or else it can be used as a useful means of transportation on the highway. The present invention includes the foldable wings which are adapted to be collapsed or folded into a small space so that the wings can be carried with the plane at all times and wherein the device will be within the legal width for road travel. The wing is split lengthwise so that the rear portion can be folded over or under the front portion depending upon whether the aircraft is of the high or low wing type. The front half or portion of the wing is supported by the struts 18 which are pivotally connected to the fuselage by means of the pivot 19. The parts can be made of any suitable material and in different shapes or sizes. The locks 33 serve to lock the wings in open or extended position and these locks can be manually operated. The lever 26 can be moved to different positions so as to permit the rear portions 17 or 38 to occupy different angular positions with respect to the front portion of the wings so as to permit or allow for a flap action which will provide greater lift and shorter take off and landing. The lever 26 may be provided with a safety limit control, and when the airplane is stopped and the wings are ready to be folded, this safety can be released and the lever can be extended slightly which will permit the back portion of the wing to drop free for folding. If desired, the folding operation can be hydraulically controlled.

In the high wing type of aircraft, the back portion or back half folds over the front portion which is opposite from the low wing version which has the back portion folding under the front portion. Also, in the high wing type, the hook members are in a reversed position.

The lever 26 constitutes a handle which may be arranged in the same position as the flap lever in a conventional airplane and can be located between the pilot and the copilot's seats. The ratchet 27 pawl assembly 26' permits the lever to be placed in any desired position and in the fold back position, the lever releases the back half of the wing for folding as previously described. The lever 26 is mounted on the shaft 24 which is in line with the cam shafts 23 which are arranged in each wing. The coupling 25 may be of conventional construction, and may include a suitable slotted connection, and also if desired flexible shafts can be used in this assembly.

Furthermore, the nose wheel 13 may have a hydraulic motor which is supplied by a pump mounted on the engine which uses a simple open center system and this drive will serve to propel the device when being used on the highway.

Furthermore, the principle of the present invention may be incorporated in a toy and wherein certain of the parts may be molded of plastic.

As shown in Figures 4, 5 and 6, for example, locks 45 may be provided for retaining the wings in folded position so as to prevent accidental opening or movement of the wings. The numeral 43 indicates hydraulically actuated cylinders which can be used for moving the wings to open or closed position, and if desired, cables such as the cables 44 can be used for drawing the back half of the wing up against the front half as the whole assembly is folded back, and the cables 44 may be trained over suitable pulleys. The hydraulic cylinders 43 may also serve to hold the wings in position.

The above description of the invention is for illustrative purposes only and it is understood that modifications may be made in the construction within the scope and spirit of the following claims.

I claim:

1. In a device of the character described, a fuselage, wheels depending from said fuselage, a pair of wings extending outwardly from opposite sides of said fuselage, said wings extending outwardly from the lower portion of the fuselage and each including a first portion and a second portion, said second portions being hingedly connected to the rear longitudinal edge of said first portions and said second portions being mounted for movement into and out of position below said first portions, struts having one end secured to the first portions of said wings and said struts being pivotally connected to said fuselage, a first shaft rotatably mounted in said fuselage, a lever for rotating said shaft, a second shaft rotatably mounted in the first portion of each wing, couplings for connecting said second and first shafts together, hook members carried by said second shafts, brackets connected to the second portions of said wings, pins carried by said brackets for engagement by said hook members, pivot members pivotally connecting the first portions of said wings to said fuselage, and locks for selectively maintaining the first portions of said wings connected to said fuselage.

2. The structure as defined in claim 1 and further including a ratchet mounted on said first shaft and adapted to be operatively connected to said lever to retain said lever in various adjusted positions and means on said ratchet for securing said ratchet to said fuselage whereby said ratchet is retained in immobile relation to said lever.

3. In a device of the character described, a fuselage, wings including first and second portions hingedly connected together, brackets having pins thereon mounted on each of said first portions, rotating shafts mounted in each of said second portions, hook members mounted on said shafts and adapted to be moved into engagement with the pins on said brackets for maintaining said first and second portions in a substantially coplanar position, said hook members being releasable from the pins to permit the first and second portions to move to a side by side position, and pivot means for permitting the first and second portions to move to a position wherein the longitudinal axis of the first and second portions is parallel to the longitudinal axis of the fuselage.

References Cited in the file of this patent

UNITED STATES PATENTS 1,887,676    Brylka               Nov. 15, 1932

FOREIGN PATENTS 372,344    Great Britain         Apr. 29, 1932